United States Patent
Jing

(10) Patent No.: US 9,868,857 B2
(45) Date of Patent: Jan. 16, 2018

(54) COMPOSITE PRODUCTS CONTAINING A POWDERED BINDER AND METHODS FOR MAKING AND USING SAME

(71) Applicant: Georgia-Pacific Chemicals LLC, Atlanta, GA (US)

(72) Inventor: Feng Jing, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 14/967,304

(22) Filed: Dec. 12, 2015

(65) Prior Publication Data

US 2016/0185967 A1 Jun. 30, 2016

Related U.S. Application Data

(60) Provisional application No. 62/097,668, filed on Dec. 30, 2014.

(51) Int. Cl.
*B32B 21/02* (2006.01)
*C08L 97/02* (2006.01)
*B32B 21/13* (2006.01)

(52) U.S. Cl.
CPC .............. *C08L 97/02* (2013.01); *B32B 21/02* (2013.01); *B32B 21/13* (2013.01); *B32B 2260/026* (2013.01); *B32B 2260/046* (2013.01)

(58) Field of Classification Search
CPC .... C03C 25/321; C08L 97/02; C08L 101/025; C09D 197/02; C09D 201/025; E04B 1/7658; E04B 1/7662; E04B 1/7568; F16L 59/028; F16L 59/08; B32B 21/02; B32B 21/13; B32B 2260/026; B32B 2260/046; C08J 3/122; B27N 3/04
USPC .................. 106/501.1, 162.5, 217.6; 252/62; 427/384, 201; 524/47; 428/292.4
See application file for complete search history.

(56) References Cited

U.S. PATENT DOCUMENTS

| | | | |
|---|---|---|---|
| 2006/0148363 A1* | 7/2006 | Lavoie ..................... | B27N 3/04 442/413 |
| 2007/0027283 A1* | 2/2007 | Swift ....................... | C07H 5/04 527/312 |
| 2010/0301256 A1* | 12/2010 | Hampson .............. | C03C 25/321 252/62 |

* cited by examiner

*Primary Examiner* — Camie S Thompson
(74) *Attorney, Agent, or Firm* — Ram W. Sabnis

(57) ABSTRACT

Composite products, powdered binders, resinated furnishes, and methods for making and using same. In one example, a composite product can include a plurality of lignocellulose substrates and an at least partially cured, powdered binder. Prior to curing the powdered binder can include about 5 wt % to about 95 wt % of a powdered carbohydrate, and about 5 wt % to about 95 wt % of a powdered nitrogen-containing compound, where the weight percent values are based on a total weight of the powdered carbohydrate and the powdered nitrogen-containing compound. The powdered carbohydrate can include a monosaccharide, a disaccharide, or a mixture thereof. The powdered nitrogen-containing compound can include an ammonium compound, an alkylammonium compound, an amino acid, a hydrate thereof, a salt thereof, or any mixture thereof.

18 Claims, No Drawings

US 9,868,857 B2

COMPOSITE PRODUCTS CONTAINING A POWDERED BINDER AND METHODS FOR MAKING AND USING SAME

CROSS-REFERENCE TO RELATED APPLICATION

This application claims priority to U.S. Provisional Patent Application No. 62/097,668, filed on Dec. 30, 2014, which is incorporated by reference herein.

BACKGROUND

Field

Embodiments described generally relate to composite products and methods for making and using same. More particularly, such embodiments relate to lignocellulose composite products that include an at least partially cured powdered binder that, prior to curing, includes a powdered carbohydrate and a powdered nitrogen-containing compound and methods for making and using same.

Description of the Related Art

The production of lignocellulose composite products requires an adhesive or a binder to bond the discrete sheets, veneers, particulates, fibers, or other substrates to one another. Typical lignocellulose composite products include oriented strand boards, waferboards, particleboards, fiberboards, and other composite products. Conventional binders used in the production of these composite products are in a liquid state and generally contain a mixture of a resin and a solvent, such that the resin is contained in an aqueous solution or an organic solution. Usually, additives, such as surfactants or thickeners, must be included in the mixture of the resin and the solvent to provide a desirable viscosity for the final binder mixture. Although conventional binders are used to produce finished composite products having desirable properties, such as strength, these liquid state binders tend to take a relatively long time, e.g., about 15 minutes or longer, to cure and/or dry when pressed and heated to form the composite product.

Further, typical binders used in the production of lignocellulose products include formaldehyde-based resins, such as urea-formaldehyde (UF), melamine-formaldehyde (MF), melamine-urea-formaldehyde (MUF), and phenol-formaldehyde (PF). Such resins can potentially release formaldehyde into the environment during the production thereof, during application to a lignocellulose substrate, during curing of the resin/substrate, as well as, from the finished product. Various techniques have been used to reduce the amount of formaldehyde released from formaldehyde-based resins and products that include formaldehyde-based resins. For example, the addition of formaldehyde scavengers to the formaldehyde-based resin and/or various modifications to the particular synthesis steps used to make the formaldehyde-based resin such as the addition of urea as a reactant late in the resin synthesis have been used in an attempt to reduce formaldehyde emission. These attempts to reduce formaldehyde emission, however, are accompanied with undesirable effects such as longer cure times, reduced resin shelf-life, reduced product strength, reduced tolerance for processing variations, and/or inferior moisture resistance.

There is a need, therefore, for composite products made with binder compositions that cure and/or dry faster than conventional binders, have reduced formaldehyde emission, and/or have acceptable or improved internal bond strength and/or other physical properties, and methods for making and using same.

SUMMARY

Composite products, powdered binders, resinated furnishes, and methods for making and using same are provided. In one example, a composite product can include a plurality of lignocellulose substrates and an at least partially cured, powdered binder. Prior to curing the powdered binder can include about 5 wt % to about 95 wt % of a powdered carbohydrate, and about 5 wt % to about 95 wt % of a powdered nitrogen-containing compound, where the weight percent values are based on a total weight of the powdered carbohydrate and the powdered nitrogen-containing compound. The powdered carbohydrate can include a monosaccharide, a disaccharide, or a mixture thereof. The powdered nitrogen-containing compound can include an ammonium compound, an alkylammonium compound, an amino acid, a hydrate thereof, a salt thereof, or any mixture thereof.

In one example, a resinated furnish can include a plurality of lignocellulose substrates and a powdered binder. The powdered binder can include about 5 wt % to about 95 wt % of a powdered carbohydrate and about 5 wt % to about 95 wt % of a powdered nitrogen-containing compound, where the weight percent values are based on a total weight of the powdered carbohydrate and the powdered nitrogen-containing compound. The powdered carbohydrate can include a monosaccharide, a disaccharide, or a mixture thereof. The powdered nitrogen-containing compound can include an ammonium compound, an alkylammonium compound, an amino acid, a hydrate thereof, a salt thereof, or any mixture thereof.

In one example, a method for producing a composite product can include contacting a plurality of lignocellulose substrates with a powdered binder to produce a mixture. The powdered binder can include about 5 wt % to about 95 wt % of a powdered carbohydrate and about 5 wt % to about 95 wt % of a powdered nitrogen-containing compound, wherein the weight percent values are based on a total weight of the powdered carbohydrate and the powdered nitrogen-containing compound. The powdered carbohydrate can include a monosaccharide, a disaccharide, or a mixture thereof. The powdered nitrogen-containing compound can include an ammonium compound, an alkylammonium compound, an amino acid, a hydrate thereof, a salt thereof, or any mixture thereof. The mixture can be heated at a temperature of about 100° C. to about 300° C. for about 1 minute to less than 10 minutes to produce a composite product that includes the powdered binder at least partially cured.

DETAILED DESCRIPTION

One or more powdered carbohydrates and one or more powdered nitrogen-containing compounds can be mixed, blended, or otherwise combined with a plurality of lignocellulose substrates to produce a mixture or "resinated furnish" and the powdered binder can be at least partially cured to produce a composite product. The mixture of the lignocellulose substrates and the powdered binder can be heated to at least partially cure the powdered binder. The mixture of the lignocellulose substrates and the powdered binder can also be pressed before and/or during heating of the mixture to produce the composite product. It has been surprisingly and unexpectedly discovered that the composite products containing the at least partially cured, powdered binder can be produced at relatively fast rates, such as, for example, about 1 minute to less than 10 minutes, about 2 minutes to less than 8 minutes, or about 3 minutes to about 6 minutes. In comparison, composite products containing traditional binders having a liquid state are typically produced at a rate of greater than 10 minutes, such as about 15 minutes or longer. Also surprisingly, the composite products containing the at least partially cured, powdered binder can have an internal bond strength of about 138 kPa to about 552 kPa, as measured according to ASTM D1037-12. For example, the composite products containing the at least partially cured, powdered binder can have an internal bond strength of greater than 138 kPa after being pressed and heated for about 3 minutes, greater than 276 kPa after being pressed and heated for about 5 minutes, and greater than 345 kPa or greater than 414 kPa after being pressed and heated for about 6 minutes.

The powdered carbohydrate can be or include one or more monosaccharides, one or more disaccharides, or a mixture thereof. Illustrative monosaccharides can be or include, but are not limited to, fructose (levulose), galactose, glucose (dextrose), mannose, ribose, sorbose, xylose, glyceraldehyde (aldotrioses, such as L-glyceraldehyde and D-glyceraldehyde), dihydroxyacetone, erythrose, isomers thereof, hydrates thereof, salts thereof, or any mixture thereof. Illustrative disaccharides can be or include, but are not limited to, sucrose, lactose, maltose, lactulose, trehalose, cellobiose, isomers thereof, hydrates thereof, salts thereof, or any mixture thereof. In some specific examples, the powdered carbohydrate can be or include glucose, fructose, galactose, sucrose, lactose, maltose, lactulose, isomers thereof, hydrates thereof, salts thereof, or any mixture thereof.

The powdered nitrogen-containing compound can be or include, but is not limited to, one or more ammonium compounds, one or more alkylammonium compounds, one or more amino acids, hydrates thereof, salts thereof, or any mixture thereof. The powdered nitrogen-containing compound can be an ammonium salt that can include one or more cations and one or more anions. The ammonium compound can be represented by the chemical formula $[N_4N][A]$, where A can be an anion. The alkylammonium compound can be represented by the chemical formula $[R^1R^2R^3R^4N][A]$, where $R^1$, $R^2$, $R^3$, and $R^4$ can independently be, but are not limited to, a hydrogen or a substituted or unsubstituted linear, branched, cyclic, heterocyclic, or aromatic hydrocarbyl group, and A can be an anion. For example, $R^1$, $R^2$, $R^3$, and $R^4$ can independently be, but are not limited to, hydrogen, an alkyl, an alkenyl, an alkynyl, a phenyl, an aryl, an alkanol, an alkoxyl, a carboxyl, an isomer thereof, or a derivative thereof. In some examples, $R^1$, $R^2$, $R^3$, and $R^4$ can independently be, but are not limited to, hydrogen, methyl, ethyl, propyl, butyl, pentyl, phenyl, aryl, an isomer thereof, or a derivative thereof. The anion A can be, but is not limited to, lignosulfonate, sulfamate, sulfite, sulfate, nitrite, nitrate, phosphite, phosphate, carbonate, a halide (F, Cl, Br, or I), hydroxide, or a derivative thereof.

Illustrative ammonium compounds can be or include, but are not limited to, ammonium lignosulfonate, ammonium sulfamate, ammonium sulfite, ammonium sulfate, ammonium nitrite, ammonium nitrate, ammonium phosphite, ammonium phosphate, ammonium carbonate, an ammonium halide (F, Cl, Br, or I), ammonium hydroxide, isomers thereof, hydrates thereof, salts thereof, or any mixture thereof. Illustrative alkylammonium compounds can be or include, but are not limited to, alkylammonium lignosulfonate, alkylammonium sulfamate, alkylammonium sulfite, alkylammonium sulfate, alkylammonium nitrite, alkylammonium nitrate, alkylammonium phosphite, alkylammonium phosphate, alkylammonium carbonate, alkylammonium halide (F, Cl, Br, or I), alkylammonium hydroxide, isomers thereof, hydrates thereof, salts thereof, or any mixture thereof. Illustrative amino acids can be or include, but are not limited to, lysine, arginine, histidine, asparagine, glutamine, tryptophan, isomers thereof, hydrates thereof, salts thereof, or any mixture thereof. In some specific examples, the powdered nitrogen-containing compound can be or include ammonium lignosulfonate, ammonium sulfamate, alkylammonium lignosulfonate, alkylammonium sulfamate, lysine, arginine, histidine, isomers thereof, hydrates thereof, salts thereof, or any mixture thereof.

The powdered binder can include about 5 wt %, about 10 wt %, about 15 wt %, about 20 wt %, about 25 wt %, about 30 wt %, about 35 wt %, about 40 wt %, about 50 wt %, about 60 wt %, about 70 wt %, about 80 wt %, about 85 wt %, about 90 wt %, or about 95 wt % of the powdered carbohydrate, based on the total weight of the powdered carbohydrate and the powdered nitrogen-containing compound. For example, the powdered binder can include about 5 wt % to about 95 wt %, about 40 wt % to about 95 wt %, about 60 wt % to about 95 wt %, about 60 wt % to about 80 wt %, about 70 wt % to about 90 wt %, or about 75 wt % to about 85 wt % of the powdered carbohydrate, based on the total weight of the powdered carbohydrate and the powdered nitrogen-containing compound. The powdered binder can include about 5 wt %, about 10 wt %, about 15 wt %, about 20 wt %, about 25 wt %, about 30 wt %, about 40 wt %, about 50 wt %, about 60 wt %, about 70 wt %, about 80 wt %, about 85 wt %, about 90 wt %, or about 95 wt % of the powdered nitrogen-containing compound, based on the total weight of the powdered carbohydrate and the powdered nitrogen-containing compound. For example, the powdered binder can include about 5 wt % to about 95 wt %, about 5 wt % to about 60 wt %, about 5 wt % to about 40 wt %, about 10 wt % to about 40 wt %, about 10 wt % to about 30 wt %, about 10 wt % to about 25 wt %, about 15 wt % to about 40 wt %, about 15 wt % to about 30 wt %, or about 15 wt % to about 25 wt % of the powdered nitrogen-containing compound, based on the total weight of the powdered carbohydrate and the powdered nitrogen-containing compound.

In some examples, the powdered binder can include about 5 wt % to about 95 wt % of the powdered carbohydrate and about 5 wt % to about 95 wt % of the powdered nitrogen-containing compound, where the weight percent values are based on the total weight of the powdered carbohydrate and the powdered nitrogen-containing compound. In other examples, the powdered binder can include about 60 wt % to about 95 wt % of the powdered carbohydrate and about 5 wt % to about 40 wt % of the powdered nitrogen-containing compound, where the weight percent values are based on the total weight of the powdered carbohydrate and the powdered nitrogen-containing compound. In other examples, the powdered binder can include about 70 wt % to about 90 wt % of the powdered carbohydrate, and about 10 wt % to about 30 wt % of the powdered nitrogen-containing compound, where the weight percent values are based on the total weight of the powdered carbohydrate and the powdered nitrogen-containing compound.

In some specific examples, the powdered carbohydrate can be or include glucose and the powdered nitrogen-containing compound can be or include ammonium lignosulfonate, lysine, or both ammonium lignosulfonate and lysine. For example, the powdered binder can include about 70 wt % to about 90 wt % or about 75 wt % to about 85 wt % of glucose and about 10 wt % to about 30 wt % or about 15 wt % to about 25 wt % of ammonium lignosulfonate and/or lysine, where the weight percent values are based on the total weight of the powdered carbohydrate (e.g., glucose) and the powdered nitrogen-containing compound (e.g., ammonium lignosulfonate and/or lysine).

The powdered binder can be combined with a plurality of lignocellulose substrates or other furnishes to produce a lignocellulose-based binder mixture that can include the lignocellulose substrates and the powdered binder. The powdered binder can be in powdered form when combined with the plurality of lignocellulose substrates or other furnishes to produce the lignocellulose-based binder mixture. The lignocellulose-based binder mixture can be formed into a mat, panel, or other form, and the powdered binder can be at least partially cured or completely cured to produce a composite product or a portion or part of a composite product, such as one or more layers, panels, cores, or faces. The lignocellulose-based binder mixture can include about 0.2 wt %, about 0.5 wt %, about 0.9 wt %, about 1 wt %, or about 1.5 wt % to about 2 wt %, about 2.5 wt %, about 3 wt %, about 5 wt %, or about 10 wt % of the powdered binder, based on the dry weight of the lignocellulose substrates. For example, the lignocellulose-based binder mixture can include about 0.5 wt % to about 10 wt %, about 1 wt % to about 10 wt %, about 1 wt % to about 5 wt %, about 1 wt % to about 4 wt %, about 1 wt % to about 3 wt %, about 1 wt % to about 2 wt %, about 1.5 wt % to about 2.5 wt %, about 1.5 wt % to about 2 wt %, about 2 wt % to about 3 wt %, or about 2 wt % to about 2.5 wt %, of the powdered binder, based on the dry weight of the lignocellulose substrates. Similarly, the composite product can include about 0.2 wt %, about 0.5 wt %, about 0.9 wt %, about 1 wt %, or about 1.5 wt % to about 2 wt %, about 2.5 wt %, about 3 wt %, about 5 wt %, or about 10 wt % of the at least partially cured powdered binder, based on the dry weight of the lignocellulose substrates.

In some examples, the composite product and/or the lignocellulose-based binder mixture can include one or more waxes and/or other hydrophobic additives. Illustrative waxes can be or include, but are not limited to, slack wax, paraffin wax, castor wax, acids thereof, salts thereof, or any mixture thereof. The composite product and/or the lignocellulose-based binder mixture can include about 0.1 wt %, about 0.5 wt %, about 0.8 wt %, or about 0.9 wt % to about 1 wt %, about 1.2 wt %, about 1.5 wt %, about 2 wt %, about 2.5 wt %, about 3 wt %, about 5 wt %, or about 10 wt % of the wax, based on the dry weight of the lignocellulose substrates. For example, the composite product and/or the lignocellulose-based binder mixture can include about 0.1 wt % to about 10 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1 wt %, about 0.5 wt % to about 1.5 wt %, about 0.7 wt % to about 5 wt %, about 0.7 wt % to about 4 wt %, about 0.7 wt % to about 3 wt %, about 0.7 wt % to about 2 wt %, or about 0.7 wt % to about 1 wt % of the wax, based on the dry weight of the lignocellulose substrates. In several specific examples, the composite product and/or the lignocellulose-based binder mixture can include about 0.1 wt % to about 5 wt %, about 0.5 wt % to about 2 wt %, about 0.5 wt % to about 1.5 wt %, or about 0.5 wt % to about 1 wt % of the wax, based on the dry weight of the lignocellulose substrates. Alternatively, in other examples, the composite product and/or the lignocellulose-based binder mixture can be free of the one or more waxes or other hydrophobic additives.

In some examples, the composite product and/or the lignocellulose-based binder mixture can include one or more fillers and/or extenders. Illustrative fillers can be or include, but are not limited to, nut shell media, corn media or corn cob media, furfural residues, or any mixture thereof. Nut shell media can be or include, but are not limited to, whole, broken, chopped, crushed, milled, and/or ground shells from one or more nuts and/or seeds. Illustrative nut shell media can include, but is not limited to, almond, walnut, pecan, chestnut, hickory, cashew, peanut, macadamia, or any mixture thereof. Corn media can be or include, but are not limited to, broken, chopped, crushed, or ground corn cobs, corn stalks, or other corn derived products, or any mixture thereof. Corn media can also include furfural residue from corn cobs, corn stalks, or other corn derived products. An illustrative corn derived product can include, but is not limited to, a cellulose byproduct derived from the manufacture of furfural, such as WILVACO-FIL® corn cob residue, commercially available from Willamette Valley Company, Inc., Eugene, Oreg. Furfural residues, including floral and furfural-derived compounds, can also come from oat, wheat, wheat bran, barely, wood particles, sawdust, and/or other plant-based products.

Illustrative extenders can be or include, but are not limited to, one or more flours, one or more polysaccharides, one or more starches, one or more polysaccharide starches, or any mixture thereof. Flours can be ground or milled to a variety of different granular sizes, such as fine, ultra-fine, or very ultra-fine granular sizes. Illustrative flours can be or include, but are not limited to, wheat flour, corn flour, soy flour, oat flour, other grain flours, nut or seed flour (e.g., almond, walnut, pecan, cashew, or peanut), brands thereof, starches thereof, or any mixture thereof. In some examples, the extender can be or include corn flours or corn starches, such as NCS-83, NCS-74, and 4501 flours, commercially available from Didion Milling Company, Inc., Sun Prairie, Wis. In other examples, the extender can be or include wheat flours, wheat starches, and/or wheat derived protein-starch composition, such as Glu-X extender, commercially available from Siemer Milling Company, Teutopolis, Ill. Illustrative polysaccharides can include, but are not limited to, starch, cellulose, gums, such as guar and xanthan, alginates, pectin, gellan, or any mixture thereof. Suitable polysaccharide starches can include, for example maize or corn, native corn starch (NCS), waxy maize, high amylose maize, potato, tapioca, wheat starch, or any mixture thereof. Other starches, such as genetically engineered starches, can be or include high amylose potato starches, potato amylopectin starches, or any mixture thereof.

In some examples, the composite product and/or the lignocellulose-based binder mixture can be free or substantially free of any polycarboxylic acid, any polymeric polycarboxylic acid, and/or any carboxylic anhydride. As such, any melanoidins produced by reacting the powdered carbohydrate and the powdered nitrogen-containing compound can be free or substantially free of any crosslink derived from a polycarboxylic acid, a polymeric polycarboxylic acid, and/or a carboxylic anhydride. In other examples, any melanoidins produced by reacting the powdered carbohydrate and the powdered nitrogen-containing compound can be free or substantially free of any crosslinks. Said another way, the at least partially cured binder can include melanoidins that are not crosslinked with one another.

In some examples, the composite product and/or the lignocellulose-based binder mixture can include less than 5 wt %, less than 4 wt %, less than 3 wt %, less than 2 wt %, less than 1 wt %, less than 0.5 wt %, less than 0.3 wt %, less than 0.1 wt %, or less than 0.05 wt % of any polycarboxylic acid, based on the total weight of the powdered carbohydrate and the powdered nitrogen-containing compound. In some examples, the composite product and/or the lignocellulose-based binder mixture can include less than 5 wt %, less than 4 wt %, less than 3 wt %, less than 2 wt %, less than 1 wt %, less than 0.5 wt %, less than 0.3 wt %, less than 0.1 wt %, or less than 0.05 wt % of any polymeric polycarboxylic acid, based on the total weight of the powdered carbohydrate and the powdered nitrogen-containing compound. In other examples, the composite product and/or the lignocellulose-based binder mixture can include less than 5 wt %, less than 4 wt %, less than 3 wt %, less than 2 wt %, less than 1 wt %, less than 0.5 wt %, less than 0.3 wt %, less than 0.1 wt %, or less than 0.05 wt % of any carboxylic anhydride, based on the total weight of the powdered carbohydrate and the powdered nitrogen-containing compound. In other examples, the composite product and/or the lignocellulose-based binder mixture can include less than 5 wt %, less than 4 wt %, less than 3 wt %, less than 2 wt %, less than 1 wt %, less than 0.5 wt %, less than 0.3 wt %, less than 0.1 wt %, or less than 0.05 wt % of any polycarboxylic acid, any polymeric polycarboxylic acid, and any carboxylic anhydride, based on the total weight of the powdered carbohydrate and the powdered nitrogen-containing compound.

Illustrative polycarboxylic acids can be or include, but are not limited to, glutaric acid; adipic acid; azelaic acid; malonic acid; suberic acid; sebacic acid; succinic acid; oxalic acid; pimelic acid; 2-methylsuccinic acid; undecanedioic acid; dodecandioic acid; 2-methylglutaric acid; 3,3-dimethylglutaric acid; acids of tricarboxypentane such as 4-carboxypimelic acid; alicyclic saturated acids such as 1,2-cyclohexanedicarboxylic acid, 1-3-cyclohexanedicarboxylic acid, 1,4-cyclohexanedicarboxylic acid, and 1-3-cyclopentanedicarboxylic acid; unsaturated aliphatic acids such as maleic acid, fumaric acid, itaconic acid, citraconic acid, mesaconic acid, aconitic acid, and hexane-3-diotic acid; unsaturated alicyclic acids such as 1,4-cyclohexenedicarboxylic acid; aromatic acids such as phthalic acid, isophtalic acid, terephthalic acid, 2,3-naphthalenedicarboxylic acid, and benzene-1,4-diacetic acid; and heteroaliphatic acids such as diglycolic acid, thiodiglycolic acid, dithiodiglycolic acid, iminodiacetic acid, and methyliminodiacetic acid; derivatives thereof or any mixture thereof. Illustrative polymeric polycarboxylic acids can be or include, but are not limited to, polyacrylic acid, polymethacrylic acid, polymaleic acid, and other polymeric polycarboxylic acids, copolymers thereof, anhydrides thereof, or any mixture thereof. Illustrative carboxylic anhydrides can be or include, but are not limited to, succinic anhydride, maleic anhydride, or a mixture thereof. Illustrative polycarboxylic acids, polymeric polycarboxylic acids, and carboxylic anhydrides can include those discussed and described in U.S. Pat. Nos. 7,772,347; and 7,947,765.

Illustrative composite products can be or include, but are not limited to, oriented strand boards (OSB), waferboards, laminated veneer lumber (LVL), laminated veneer boards (LVB), engineered wood flooring, particleboards, fiberboards (e.g., medium density fiberboards (MDF) and/or high density fiberboards (HDF), or other wood and non-wood products. In some examples, the powdered binder can be applied or otherwise disposed between two or more wood veneers or wood sheets to produce the composite product (e.g., OSB, plywood, LVL, LVB, or engineered wood flooring). The plurality of lignocellulose substrates can include wood veneers or wood sheets and the powdered binder can be disposed between wood veneers or wood sheets. In other examples, the composite product can be formed by combining the plurality of lignocellulose substrates and the powdered binder to produce a lignocellulose-based binder mixture that is heated to produce the composite product (e.g., particleboard, MDF, or HDF).

In one or more examples, the composite product can be an OSB, a medium density fiberboard, a wafer board, or a particle board. For example, the composite product can be an OSB or a waferboard having one or more core layers disposed between two face layers. The core layers can include a core composition and the face layers can include a face composition. The core composition can include one or more powdered binders or other binders, such as one or more aldehyde-based resins. The face composition can include one or more powdered binders. The composite product can have a face to core ratio of about 40:60 to about 60:40, about 50:50 to about 60:40, about 50:50 to about 65:35, about 52:58 to about 60:40, or about 55:45.

In one or more examples, the core composition can include a plurality of lignocellulose substrates, one or more at least partially or completely cured resin compositions, optionally one or more waxes and/or other hydrophobic additives. The resin compositions can be or include one or more polymeric materials, homopolymeric materials, copolymeric materials, oligomeric materials, combinations thereof, or any mixture thereof.

In some examples, the core composition can include one or more at least partially or completely cured aldehyde-based resins. The aldehyde-based resins can be or include a phenol-formaldehyde (PF) resin, a urea-formaldehyde (UF) resin, a melamine-formaldehyde (MF) resin, a resorcinol-formaldehyde (RF) resin, a phenol-resorcinol-formaldehyde (PRF) resin, a phenol-urea-formaldehyde (PMUF) resin, a melamine-urea-formaldehyde (MUF) resin, a phenol-melamine-formaldehyde (PMF) resin, or any mixture thereof. Several PF resins that can be used to make the core composition of the composite products can include an aqueous phenol-formaldehyde resin, such as GP REST-BOND® 5772 plywood neat resin, commercially available from Georgia-Pacific Chemicals LLC, a phenol-formaldehyde resin powder, such as WOODWELD® 190C42 spray-dried OSB adhesive, commercially available from Georgia-Pacific Chemicals LLC, or a mixture thereof.

In other examples, the core composition can include other at least partially or completely cured resins, with or without aldehyde-based resins. For example, the other resins can be or include a methylene diphenyl diisocyanate (MDI) resin, a polymeric methylene diphenyl diisocyanate (pMDI) resin, a polyurethane (PU) resin, a polyamide-epihalohydrin (PAE) resin, a styrene maleic anhydride (SMA) resin, a cationic styrene maleimide (SMI) resin, an emulsified polymer isocyanate (EPI) adhesive, combinations thereof, or any mixture thereof. Compositions for OSB cores and methods for producing such cores, including binders and/or resins that can be used in the manufacture of the composite products discussed and described herein can include those discussed and described in U.S. Patent Application Publication Nos. 2011/0165398 and 2013/0292864.

In some examples, the core layers can include a first plurality of lignocellulose substrates and one or more at least partially or completely cured aldehyde-based resins. The core layers can include about 0.5 wt % to about 8 wt % of the aldehyde-based resins, based on the dry weight of the first plurality of lignocellulose substrates. The face layers can include a second plurality of lignocellulose substrates and a powdered binder. The powdered binder can include about 5 wt % to about 95 wt % of one or more powdered carbohydrates and about 5 wt % to about 95 wt % of one or more powdered nitrogen-containing compounds, where the weight percent values are based on the total weight of the powdered carbohydrate and the powdered nitrogen-containing compound. For example, the powdered binder can include about 60 wt % to about 95 wt % of one or more powdered carbohydrates and about 5 wt % to about 40 wt % of one or more powdered nitrogen-containing compounds, where the weight percent values are based on the total weight of the powdered carbohydrate and the powdered nitrogen-containing compound. The powdered carbohydrates can be or include one or more monosaccharides, one or more disaccharides, or a mixture thereof. The powdered nitrogen-containing compound can be or include one or more ammonium compounds, one or more alkylammonium compounds, one or more amino acids, or any mixture thereof. The face layers can include about 0.5 wt % to about 8 wt % of the powdered binder, based on the dry weight of the second plurality of lignocellulose substrates.

In some examples, the core layers of the composite product can also include about 0.1 wt % to about 5 wt % of a first wax, such as one or more waxes, based on the dry weight of the first plurality of lignocellulose substrates. The face layers of the composite product can also include about 0.1 wt % to about 5 wt % of a second wax, such as one or more waxes, based on the dry weight of the second plurality of lignocellulose substrates. The wax in the core layers can be the same or different than the wax in the face layers.

A variety of composite products and other fiber or wood based composite products can be made by bonding the plurality of lignocellulose substrates or other fibers and/or substrates, the powdered binder or at least partially cured binder composition, one or more waxes, and any optional additives or fillers into a composite product. Fiber, cellulose, or wood based composite products can include or be made from lignocellulose substrates and/or cellulosic fibers, although synthetic fibers can be used alone or with lignocellulose substrates and/or cellulosic fibers to make such composite products.

In one or more example, the composite product can include fiber webs (e.g., cellulosic fiber webs) and/or the fibers (e.g., cellulosic fibers) can include at least one material selected from bleached furnish, softwood, hardwood, wood pulp, mechanical pulp, or any mixture thereof. The term "cellulosic", "cellulosic sheet", "cellulosic fiber", "cellulosic fiber web", "fiber", "fiber web", "panel", "fiber panel", "cellulose panel", "mat", or "fiber mat" is meant to include any product incorporating wood or fiber having cellulose as a major constituent. The terms "fibers" or "wood" include virgin pulps, recycle (secondary) cellulosic fibers, or fiber mixtures containing virgin cellulosic fibers and/or reconstituted cellulosic fibers. Fibers suitable for making or producing the cellulosic fiber webs, fibrous sheets, and wood products and sheets of examples described herein can include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers, such as those obtained from deciduous and coniferous trees, including softwood fibers, such as northern and southern softwood kraft fibers, hardwood fibers, such as eucalyptus, maple, birch, aspen, as well as mixtures or combinations of softwoods and hardwoods, for example, a bleached furnish (60% hardwood and 40% softwood, by weight). Illustrative types of wood can include, but are not limited to, alder, almond, apple, ash, aspen, basswood, beech, birch, cedar, cherry, chestnut, chinaberry, cottonwood, cypress, elm, eucalyptus, fir, gum, hackberry, hickory, huisache, maple, mesquite, oak, peach, pear, pecan, pine, poplar, redwood, sassafras, spruce, sycamore, tallow, walnut, and willow.

Fibers or wood used in connection with examples discussed and described herein can include naturally occurring pulp-derived fibers as well as reconstituted cellulosic fibers such as lyocell or rayon. Fibers or wood can be liberated from their source material by any one of a number of chemical pulping processes familiar to one experienced in the art including sulfate, sulfite, polysulfide, soda pulping, as well as other processes. The pulp can be bleached if desired by chemical means including the use of chlorine, chlorine dioxide, oxygen, ozone, hydrogen peroxide, alkaline peroxide, rear earth peroxides, as well as other compounds. Naturally occurring pulp-derived fibers are referred to herein simply as "pulp-derived" fibers or wood. The wood, fiber, or paper materials, as discussed and described herein for use in the composite products, can include a blend of conventional fibers (whether derived from virgin pulp or recycle sources) and high coarseness lignin-rich tubular fibers, such as bleached chemical thermomechanical pulp (BCTMP). Pulp-derived fibers thus can also include high yield fibers such as BCTMP as well as thermomechanical pulp (TMP), chemi-thermomechanical pulp (CTMP), and alkaline peroxide mechanical pulp (APMP). Recycled fibers are generally shorter, stiffer, curlier and more brittle than virgin fibers. Dewatering tests can assess fines content and the degree of external fibrillation. These tests measure how easily water drains from the wood fibers, furnish, or pulp. The Schopper-Riegler (SR) number and the Canadian Standard Freeness (CSF) are the most common dewatering tests. The SR number increases with beating and fines content while the CSF decreases.

The starting material, from which the substrates can be derived from, can be reduced to the appropriate size, if desired for a particular product being produced, by various processes such as hogging, grinding, hammer milling, tearing, shredding, and/or flaking. Suitable forms of the substrates can include, but are not limited to, chips, fibers, shavings, sawdust or dust, wood flakes, wood strands, wood wafers, wood shavings, wood particles, wood veneer, or any combination or mixture thereof. The substrates can have a length of about 0.05 mm, about 0.1 mm, about 0.2 mm to about 1 mm, about 5 mm, about 10 mm, about 20 mm, about 30 mm, about 40 mm, about 50 mm, or about 100 mm. In some examples, veneers, e.g., layers or sheets of wood, can be used for producing plywood, laminated veneer lumber, and engineered wood flooring. The veneers can have a thickness of about 0.8 mm, about 0.9 mm, about 1 mm, about 1.1 mm or about 1.2 mm to about 3 mm, about 4 mm, about 5 mm, about 6 mm, about 7 mm, about 8 mm, about 9 mm, or about 10 mm.

In one or more examples, the substrates can include wafers, flakes, or strands that can be sliced or otherwise derived from logs or other portions of trees (e.g., aspen poplar, southern yellow pine, or hardwood logs). These substrates can generally be sliced from the logs in the direction of the grain so that the inherent tree strength is maintained in the resulting panel. The strands can be elongated in shape with specific length to width ratios. The strands can be oriented in layers during the forming process so that strands on the panel surface generally lay in the direction of the length of the panel. The inner three, four, or five layers may be randomly oriented and/or cross aligned like the veneer layers in plywood. The strands in an elongated arrangement in the surface layers increase the strength and stiffness of the panel in the direction of the alignment.

The lignocellulose substrates can include liquid on, about, and/or within the substrates. For example, the lignocellulose substrates can have a liquid, e.g., moisture, content of about 1 wt %, about 2 wt %, about 3 wt %, about 4 wt %, or about 5 wt % to about 7 wt %, about 9 wt %, about 11 wt %, about 13 wt %, about 15 wt %, about 17 wt %, about 19 wt %, about 21 wt %, about 23 wt %, about 25 wt %, about 27 wt %, about 29 wt %, about 31 wt %, about 33 wt %, about 35 wt %, or about 37 wt % based on a dry weight of the lignocellulose substrate. In another example, the lignocellulose substrates can have a liquid, e.g., moisture, content of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %. The lignocellulose substrates can be fresh, e.g., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

The lignocellulose substrates can be contacted with the powdered binder to produce a resinated furnish. As noted above the powdered binder can also include one or more waxes, and/or any optional additives or fillers. The powdered binder can be contacted with the lignocellulose substrates by coating, agitating, mixing, stirring, blending, tumbling, brushing, falling film or curtain coater, spraying, dipping, soaking, extrusion, or combinations of such techniques. It should be noted that the wax and/or any optional additives or fillers, if present, can be separately contacted with the lignocellulose substrates to produce the resinated furnish. The mixture of the lignocellulose substrates and the powdered binder, and if present the one or more waxes and/or any optional additives or fillers can be formed into a desired shape before, during, and/or after at least partial curing of the lignocellulose-based binder mixture and/or one or more waxes. Depending on the particular product, the mixture of the lignocellulose substrates and the powdered binder can be pressed before, during, and/or after the powdered binder is at least partially cured. For example, the mixture of the lignocellulose substrates, the powdered binder, and optionally one or more other components, e.g., one or more waxes, can be consolidated or otherwise formed into a desired shape, if desired pressed to a particular density and thickness, and heated to at least partially cure or completely cure the powdered binder.

The composite product having an at least partially or completely cured powdered binder can have an internal bond strength of about 207 kPa, about 276 kPa, or about 345 kPa to about 414 kPa, about 552 kPa, about 621 kPa, about 689 kPa, or about 758 kPa, as measured according to ASTM D1037-12. For example, the composite product can have an internal bond strength of about 207 kPa to about 758 kPa, about 345 kPa to about 758 kPa, or about 207 kPa to about 621 kPa, as measured according to ASTM D1037-12.

In one example, the composite product, once heated at a temperature of about 140° C. to about 280° C. for about 6 minutes, can have an internal bond strength of about 138 kPa, about 207 kPa, or about 276 kPa to about 345 kPa, about 414 kPa, about 483 kPa, about 552 kPa, or about 621 kPa, as measured according to ASTM D1037-12. For example, the composite product, once heated at a temperature of about 140° C. to about 280° C. for about 6 minutes, can have an internal bond strength of about 138 kPa to about 621 kPa, about 207 kPa to about 552 kPa, or about 276 kPa to about 621 kPa, as measured according to ASTM D1037-12. In some specific examples, the lignocellulose-based binder mixture can be pressed at a pressure of about 1 MPa to about 10 MPa or about 3 MPa to about 6 MPa and heated at a temperature of about 140° C. to about 280° C. for about 3 minutes to about 6 minutes to produce the composite product that can have an internal bond strength of about 207 kPa to about 552 kPa, as measured according to ASTM D1037-12.

The composite product having an at least partially or completely cured powdered binder can have a water absorption of about 60 wt % or less, about 55 wt % or less, about 50 wt % or less, about 45 wt % or less, about 44 wt % or less, about 43 wt % or less, about 42 wt % or less, about 41 wt % or less, about 40 wt % or less, about 39 wt % or less, about 38 wt % or less, about 37 wt % or less, about 36 wt % or less, about 35 wt % or less, about 34 wt % or less, about 33 wt % or less, about 32 wt % or less, about 31 wt % or less, about 30 wt % or less, about 29 wt % or less, about 28 wt % or less, about 27 wt % or less, about 26 wt % or less, about 25 wt % or less, about 24 wt % or less, about 23 wt % or less, about 22 wt % or less, about 21 wt % or less, about 20 wt % or less, about 15 wt % or less, about 10 wt % or less, as measured according to the Water Absorption and Thickness Swelling Test under ASTM D1037-12. In some examples, the composite product can have a water absorption of about 10 wt % to about 60 wt %, about 15 wt % to about 55 wt %, about 20 wt % to about 50 wt %, about 20 wt % to about 45 wt %, about 20 wt % to about 40 wt %, or about 20 wt % to about 35 wt %, as measured according to ASTM D1037-12.

In some examples, the composite product having an at least partially or completely cured powdered binder can have a thickness swelling of less than 40 wt %, less than 35 wt %, less than 30 wt %, less than 25 wt %, less than 24 wt %, less than 23 wt %, less than 22 wt %, less than 21 wt %, less than 20 wt %, less than 19 wt %, less than 18 wt %, less than 17 wt %, less than 16 wt %, less than 15 wt %, less than 14 wt %, less than 13 wt %, less than 12 wt %, less than 11 wt %, less than 10 wt %, less than 9 wt %, less than 8 wt %, less than 7 wt %, less than 6 wt %, or about 5 wt %, as measured according to the Water Absorption and Thickness Swelling Test under ASTM D1037-12. In some examples, the composite product can have a thickness swelling of about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 35 wt %, about 10 wt % to about 30 wt %, about 10 wt % to about 25 wt %, about 10 wt % to about 20 wt %, or about 10 wt % to about 15 wt %, as measured according to ASTM D1037-12.

In some examples, the composite product, once heated at a temperature of about 140° C. to about 280° C. for about 6 minutes, can have a thickness swelling of less than 30 wt %, less than 25 wt %, less than 24 wt %, less than 23 wt %, less than 22 wt %, less than 21 wt %, less than 20 wt %, less than 19 wt %, less than 18 wt %, less than 17 wt %, less than 16 wt %, less than 15 wt %, less than 14 wt %, less than 13 wt %, less than 12 wt %, less than 11 wt %, less than 10 wt %, less than 9 wt %, less than 8 wt %, less than 7 wt %, less than 6 wt %, or about 5 wt %, as measured according to ASTM D1037-12. In some examples, the composite product, once heated at a temperature of about 140° C. to about 280° C. for about 6 minutes, can have a thickness swelling of about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, or about 10 wt % to about 15 wt %, as measured according to ASTM D1037-12.

In some examples, the composite product can have a water absorption of about 50 wt % or less and a thickness swelling of about 15 wt % or less, as measured according to ASTM D1037-12. In other examples, the composite product can have a water absorption of about 40 wt % or less and a thickness swelling of about 10 wt % or less, as measured according to ASTM D1037-12. In other examples, the composite product can have a water absorption of about 30 wt % or less and a thickness swelling of about 10 wt % or less, as measured according to ASTM D1037-12. In other examples, the composite product can have a water absorption of about 20 wt % or less and a thickness swelling of about 5 wt % or less, as measured according to ASTM D1037-12.

In some examples, the composite product can have a density of about 0.45 g/cm$^3$, about 0.46 g/cm$^3$, about 0.47 g/cm$^3$, about 0.48 g/cm$^3$, about 0.49 g/cm$^3$, about 0.5 g/cm$^3$, about 0.51 g/cm$^3$, about 0.52 g/cm$^3$, about 0.53 g/cm$^3$, about 0.54 g/cm$^3$, about 0.55 g/cm$^3$, about 0.56 g/cm$^3$, about 0.57 g/cm$^3$, about 0.58 g/cm$^3$, about 0.59 g/cm$^3$, about 0.6 g/cm$^3$, about 0.61 g/cm$^3$, about 0.62 g/cm$^3$, about 0.63 g/cm$^3$, about 0.64 g/cm$^3$, about 0.65 g/cm$^3$, about 0.66 g/cm$^3$, about 0.67 g/cm$^3$, about 0.68 g/cm$^3$, about 0.69 g/cm$^3$, or about 0.7 g/cm$^3$ to about 0.71 g/cm$^3$, about 0.72 g/cm$^3$, about 0.73 g/cm$^3$, about 0.74 g/cm$^3$, about 0.75 g/cm$^3$, about 0.76 g/cm$^3$, about 0.77 g/cm$^3$, about 0.78 g/cm$^3$, about 0.79 g/cm$^3$, 0.8 g/cm$^3$, about 0.81 g/cm$^3$, about 0.82 g/cm$^3$, about 0.83 g/cm$^3$, about 0.84 g/cm$^3$, about 0.85 g/cm$^3$, about 0.86 g/cm$^3$, about 0.87 g/cm$^3$, about 0.88 g/cm$^3$, about 0.89 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, or about 0.96 g/cm$^3$. In some specific examples, the composite product can have a density of about 0.48 g/cm$^3$ to about 0.96 g/cm$^3$, about 0.51 g/cm$^3$ to about 0.83 g/cm$^3$, or about 0.59 g/cm$^3$ to about 0.72 g/cm$^3$.

In one or more examples, the composite product (e.g., OSB, waferboards, particleboards, or fiberboards) can have a length of about 0.1 m, about 0.5 m, about 1 m, or about 1.2 m to about 1.8 m, about 2.4 m, about 3 m, or about 3.6 m; a width of about 0.1 m, about 0.5 m, about 1 m, or about 1.2 m to about 1.8 m, about 2.4 m, about 3 m; and a thickness of about 0.1 cm, about 0.3 cm, about 0.5 cm, or about 0.8 cm to about 1 cm, about 2 cm, about 3 cm, or about 4 cm. In some examples, the composite product can have a length of about 10 cm to about 200 cm, about 10 cm to about 100 cm, or about 10 cm to about 50 cm; a width of about 10 cm to about 200 cm, about 10 cm to about 100 cm, or about 10 cm to about 50 cm; and a thickness of about 0.32 cm to about 3.81 cm, about 0.32 cm to about 3.18 cm, about 0.32 cm to about 2.54 cm, about 0.32 cm to about 1.91 cm, about 0.64 cm to about 3.81 cm, about 0.64 cm to about 3.18 cm, about 0.64 cm to about 2.54 cm, or about 0.64 cm to about 1.91 cm. In one specific example, the composite product can have a length of about 45.7 cm, a width of about 45.7 cm, and a thickness of about 1.11 cm.

In one or more examples, a method for forming, producing, or otherwise making the composite product that includes the powdered binder as discussed and described herein can include contacting the plurality of lignocellulose substrates with the powdered binder to produce the ligno-cellulose-based binder mixture, and pressing the lignocellulose-based binder mixture at a pressure of about 1 MPa to about 10 MPa and heating at a temperature of about 100° C. to about 300° C. for about 1 minute to less than 10 minutes to produce the composite product having the powdered binder at least partially cured. The powdered binder can include about 5 wt % to about 95 wt % of the one or more powdered carbohydrates and about 5 wt % to about 95 wt % of the one or more powdered nitrogen-containing compounds, where the weight percent values are based on the total weight of the powdered carbohydrates and the powdered nitrogen-containing compounds. For example, the powdered binder can include about 60 wt % to about 95 wt % of the one or more powdered carbohydrates and about 5 wt % to about 40 wt % of the one or more powdered nitrogen-containing compounds, where the weight percent values are based on the total weight of the powdered carbohydrates and the powdered nitrogen-containing compounds. The powdered carbohydrates can be or include one or more monosaccharides, one or more disaccharides, or a mixture thereof, and the powdered nitrogen-containing compounds can be or include one or more ammonium compounds, one or more alkylammonium compounds, one or more amino acids, or any mixture thereof.

In some examples, the lignocellulose-based binder mixture can be heated at a temperature of about 140° C. to about 280° C. for about 2 minutes to less than 8 minutes, such as, for example, about 3 minutes to about 6 minutes, to produce the composite product. In another example, the lignocellulose-based binder mixture can be pressed and heated for about 3 minutes to about 6 minutes to produce the composite product that can have an internal bond strength of about 207 kPa to about 552 kPa, as measured according to ASTM D1037-12. The composite product can have a thickness swelling of about 5% to about 30%, as measured according to ASTM D1037-12.

In one or more examples, the method for producing the composite product can include contacting the plurality of lignocellulose substrates with the powdered binder to produce the lignocellulose-based binder mixture or resinated furnish and at least partially curing the powdered binder to produce the composite product from the lignocellulose-based binder mixture. The powdered binder can include about 5 wt % to about 95 wt % of the powdered carbohydrate, and about 5 wt % to about 95 wt % of the powdered nitrogen-containing compound, where the weight percent values are based on the total weight of the powdered carbohydrate and the powdered nitrogen-containing compound. For example, the powdered binder can include about 60 wt % to about 95 wt % of the powdered carbohydrate, and about 5 wt % to about 40 wt % of the powdered nitrogen-containing compound, where the weight percent values are based on the total weight of the powdered carbohydrate and the powdered nitrogen-containing compound. The powdered carbohydrate can be or include a monosaccharide, a disaccharide, or a mixture thereof, and the powdered nitrogen-containing compound can be or include an ammonium compound, an alkylammonium compound, an amino acid, or any mixture thereof.

The lignocellulose-based binder mixture or resinated furnish can be heated to produce the composite product. For example, the lignocellulose-based binder mixture can be heated at a temperature of about 60° C., about 90° C., about 120° C., about 150° C., or about 160° C. to about 170° C., about 200° C., about 230° C., about 260° C., or about 300° C. to produce the composite product. In other examples, the mixture can be heated at a temperature of at least 60° C., at least 70° C., at least 80° C., at least 90° C., at least 100° C., at least 110° C., at least 120° C., at least 130° C., or at least 140° C. to about 150° C., about 155° C., about 160° C., about 165° C., about 170° C., about 180° C., about 200° C., about 225° C., about 250° C., about 275° C., or about 300° C. In other examples, the mixture can be heated at a temperature of about 140° C. to about 200° C., about 155° C. to about 175° C., about 160° C. to about 210° C., about 160° C. to about 175° C., or about 145° C. to about 225° C. In some examples, the lignocellulose-based binder mixture can be heated at a temperature of about 60° C. to about 300° C., about 120° C. to about 290° C., about 180° C. to about 280° C., about 200° C. to about 250° C., or about 210° C. to about 230° C. to produce the composite product. The lignocellulose-based binder mixture can be heated and pressed in the absence of steam. Said another way, the composite products can be produced without the use of any steam.

In one or more examples, the lignocellulose-based binder mixture can be heated in air. In one or more examples, the mixture can be heated in an inert atmosphere or a substantially inert atmosphere. For example, an inert atmosphere or substantially inert atmosphere can contain, but is not limited to, nitrogen, argon, neon, helium, or mixtures thereof. If the mixture is heated in a substantially inert atmosphere, the amount of oxygen can be less than 5 mol %, less than 3 mol %, less than 1 mol %, less than 0.5 mol %, or less than 0.1 mol % oxygen relative to the balance of gases in the inert atmosphere.

Heating the lignocellulose-based binder mixture can cause or promote the at least partial curing of the powdered binder to produce the composite product. As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the powdered binder has been applied, to be altered. When the binder composition is at least partially cured or completely cured one or more melanoidins can form when the powdered carbohydrate and the powdered nitrogen-containing compound react with one another.

Composite products in the shape or form of panels, sheets, or boards can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of panels, sheets, or boards can have an average thickness, where the average thickness is the length or distance between the first and second surfaces.

Pressure can optionally be applied to the lignocellulose-based binder mixture before, during, and/or after the lignocellulose-based binder mixture can be heated to produce the composite product. For example, if the desired shape or structure of the composite product is a panel, a sheet, or a board, an amount of the mixture sufficient to produce a composite product of the desired size, can be transported, directed, placed, introduced, disposed, or otherwise located within a press capable of pressing the mixture before the mixture is heated and/or when the mixture is heated. The press can be an open press or a closed press. In at least one specific example, an open press can be used to press the mixture when the lignocellulose-based binder mixture is heated, e.g., to a temperature of about 100° C. to about 250° C. In another example, the lignocellulose-based binder mixture can be extruded through a die (extrusion process) and heated to produce the composite product. The lignocellulose-based binder mixture can be pressed under a pressure of about 0.5 MPa, about 1 MPa, about 2 MPa, about 3 MPa, or about 4 MPa to about 5 MPa, about 6 MPa, about 8 MPa, about 10 MPa, or about 12 MPa to produce the composite product. In some examples, the lignocellulose-based binder mixture can be pressed under a pressure of about 0.5 MPa to about 12 MPa, about 1 MPa to about 10 MPa, about 3 MPa to about 5 MPa, or about 3 MPa to about 5 MPa to produce the composite product.

Illustrative open presses can be as discussed and described in U.S. Pat. Nos. 4,017,248; 5,337,655; 5,611,269; 5,950,532; 6,098,532; and 6,782,810. Suitable open presses can include, but are not limited to, the CONTIROLL® press, commercially available from Siempelkamp and the CPS® press, commercially available from Dieffenbacher.

The method for producing one or more composite products can include a continuous or semi-continuous mixing process in which the lignocellulose substrates, the powdered binder, and any other components of the lignocellulose-based binder mixture (e.g., wax additives, or fillers) can be introduced to a blender or mixer at a first or introduction region, end, area, or other locations configured to receive the lignocellulose-based binder mixture can be withdrawn from the mixer via one or more mixture recovery outlets. The mixer can be configured to contain a few hundred kilograms to several thousand kilograms. For example, in a single mixer about 500 kg/hr, about 5,000 kg/hr, about 10,000 kg/hr, or about 13,000 kg/hr to about 16,000 kg/hr, about 20,000 kg/hr, about 25,000 kg/hr, or about 30,000 kg/hr of the mixture can be recovered from the mixer. Upon leaving the mixer, the lignocellulose-based binder mixture can be deposited onto a conveyor belt and can be transported to one or more dryers, moistening systems, presses, and/or other processing equipment. For example, in at least one specific example, an OSB product can be made by blending, mixing, or otherwise combining a first or "face" mixture in a first mixer and a second or "core" mixture in a second mixer. The first mixer can produce about 13,600 kg/hr to about 15,900 kg/hr of a "face" mixture and the second mixer can produce about 18,100 kg/hr to about 20,400 kg/hr of a "core" mixture. The "face" and "core" mixtures can be used to produce a mat, panel, or sheet, where the "face" mixture makes up the outer layers of the OSB and the "core" mixture makes up the inner or core layer of the OSB.

Referring to particleboard in particular, particleboard made according to one or more examples discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more examples discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to OSB in particular, OSB made according to one or more examples discussed and described herein can meet or exceed the U.S. Department of Commerce Voluntary Performance Standard PS-2. Referring to plywood in particular, plywood made according to one or more examples discussed and described herein can meet or exceed the U.S. Department of Commerce Voluntary Performance Standard PS-1 and/or PS-2.

EXAMPLES

In order to provide a better understanding of the foregoing discussion, the following non-limiting examples are offered. Although the examples may be directed to specific examples, they are not to be viewed as limiting the invention in any specific respect. All parts, proportions, and percentages are by weight unless otherwise indicated.

In Examples 1-10, the wood flakes were southern yellow pine, the slack wax was SASOLWAX®, commercially available from Sasol Wax North America Corporation, and the phenol-formaldehyde (PF) resin was SPWC 190054 PF resin, commercially available from Georgia-Pacific Chemicals LLC.

Examples 1-5—Glucose and Ammonium Lignosulfonate

About 308 g of glucose monohydrate and about 70 g of ammonium lignosulfonate were combined and mixed in a ball miller to produce a powdered binder (about 80 wt % of glucose and about 20 wt % of ammonium lignosulfonate, hereinafter referred to as the "glucose/ammonium lignosulfonate powdered binder"). For the OSB face composition, about 8,122 g of wood flakes (about 1.5% moisture content), about 200 g of the glucose/ammonium lignosulfonate powdered binder (about 2.5 wt % of the dry weight of the wood flakes), and about 80 g of slack wax (about 1 wt % of the dry weight of the wood flakes), were added into a rotatable drum blender. The combined components were tumbled for about 3 min to obtain a consistent mixture that was transferred into a forming block and shaped into two OSB face mats. For the OSB core composition, about 10,240 g of wood flakes (about 2.3% moisture content), about 200 g of the PF resin (about 2 wt % of the dry weight of the wood flakes), and about 100 g of slack wax (about 1 wt % of the dry weight of the wood flakes), were added into a rotatable drum blender. The combined components were tumbled for about 4 min to obtain a consistent mixture that was transferred into a forming block and shaped into an OSB core mat.

An OSB was prepared by stacking in successive layers (face mat, core mat, face mat)—such that the two aligned face mats were separated by one orientated core mat to achieve a face:core ratio of 55:45 (about 55 wt % of the two face mats to about 45 wt % of the core mat). Note that flakes are typically oriented at a 90° angle between the face and core layers. The stacked mats were pressed in a Dieffenbacher press to produce the OSB to the desired thickness, then the pressure was reduced. The mats were pressed at about 3 MPa to about 5 MPa and heated at about 210° C. for about 3 min in Ex. 1, about 3.5 min in Ex. 2, about 4 min in Ex. 3, about 5 min in Ex. 4, and about 6 min in Ex. 5 to at least partially cure the powdered binder and to produce the OSB. The OSB had density of about 0.67 g/cm$^3$, and dimensions of a length of about 45.7 cm, a width of about 45.7 cm, and a thickness of about 1.11 cm.

Examples 6-10—Glucose and Lysine

About 304 g of glucose monohydrate and about 70 g of lysine monohydrochloride were combined and mixed in a container to produce a powdered binder (about 80 mol % of glucose and about 20 mol % of lysine, hereinafter referred to as the "glucose/lysine powdered binder"). For the OSB face composition, about 8,114 g of wood flakes (about 1.4% moisture content), about 200 g of the glucose/lysine powdered binder (about 2.5 wt % of the dry weight of the wood flakes), and about 80 g of slack wax (about 1 wt % of the dry weight of the wood flakes), were added into a rotatable drum blender. The combined components were tumbled for about 3 min to obtain a consistent mixture that was transferred into a forming block and shaped into two OSB face mats. For the OSB core composition, about 10,240 g of wood flakes (2.3% moisture content), about 200 g of the PF resin (about 2 wt % of the dry weight of the wood flakes), and about 100 g of slack wax (about 1 wt % of the dry weight of the wood flakes), were added into a rotatable drum blender. The combined components were tumbled for about 4 min to obtain a consistent mixture that was transferred into a forming block and shaped into an OSB core mat.

An OSB was prepared by stacking in successive layers (face mat, core mat, face mat)—such that the two aligned face mats were separated by one orientated core mat to achieve a face:core ratio of 55:45. Note that flakes are typically oriented at a 90° angle between face and core layer. The stacked mats were pressed in a Dieffenbacher press to produce the OSB to the desired thickness, then the pressure was reduced. The mats were pressed at about 3 MPa to about 5 MPa and heated at about 210° C. for about 3 min in Ex. 6, about 3.5 min in Ex. 7, about 4 min in Ex. 8, about 5 min in Ex. 9, and about 6 min in Ex. 10 to at least partially cure the powdered binder and to produce the OSB. The OSB had density of about 0.67 g/cm$^3$, and dimensions of a length of about 45.7 cm, a width of about 45.7 cm, and a thickness of about 1.11 cm.

Table 1 lists the internal bond strength and the thickness swell of the composite products, as described in Examples 1-10. In Examples 1-5, the mats were heated and pressed to form the composite product that included the glucose/ammonium lignosulfonate powdered binder. The internal bond strength values for the composite products produced in Examples 1-5 were about 214 kPa at 3 min, about 152 kPa at 3.5 min, about 165 kPa at 4 min, about 303 kPa at 5 min, and about 469 kPa at 6 min, respectively, as measured according to ASTM D1037-12. The thickness swell (TS) values for the composite products produced in Examples 1-5 were about 81% at 3 min, about 69% at 3.5 min, about 61% at 4 min, about 34% at 5 min, and about 22% at 6 min, respectively, as measured according to ASTM D1037-12.

In Examples 6-10, the mats were heated and pressed to form the composite product that included the glucose/lysine powdered binder. The internal bond strength values for the composite products produced in Examples 6-10 were about 186 kPa at 3 min, about 324 kPa at 3.5 min, about 379 kPa at 4 min, about 386 kPa at 5 min, and about 365 kPa at 6 min, respectively, as measured according to ASTM D1037-12. The thickness swell (TS) values for the composite products produced in Experiments 6-10 were about 47% at 3 min, about 25% at 3.5 min, about 24% at 4 min, about 21% at 5 min, and about 14% at 6 min, respectively, as measured according to ASTM D1037-12.

TABLE 1

Internal Bond Strength and Thickness Swell

| Ex. | Cure Time (min) | IB Strength (kPa) | TS (%) |
|---|---|---|---|
| 1 | 3 | 214 | 81 |
| 2 | 3.5 | 152 | 69 |
| 3 | 4 | 165 | 61 |
| 4 | 5 | 303 | 34 |
| 5 | 6 | 469 | 22 |
| 6 | 3 | 186 | 47 |
| 7 | 3.5 | 324 | 25 |
| 8 | 4 | 379 | 24 |
| 9 | 5 | 386 | 21 |
| 10 | 6 | 365 | 14 |

Embodiments of the present disclosure further relate to any one or more of the following paragraphs:

1. A composite product, comprising: a plurality of lignocellulose substrates; and an at least partially cured, powdered binder, wherein, prior to curing, the powdered binder comprises: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, or any mixture thereof.

2. A composite product, comprising: one or more core layers disposed between two face layers, wherein: the core layers comprise: a first plurality of lignocellulose substrates; and an at least partially cured aldehyde-based resin, wherein the core layers comprise about 0.5 wt % to about 8 wt % of the at least partially cured aldehyde-based resin, based on the dry weight of the first plurality of lignocellulose substrates; and the face layers comprise: a second plurality of lignocellulose substrates; and an at least partially cured, powdered binder, wherein the at least partially cured, powdered binder comprises: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, the powdered nitrogen-containing compound comprises an ammonium compound, an alkylammonium compound, an amino acid, or any mixture thereof, and the face layers comprises about 0.5 wt % to about 8 wt % of the powdered binder, based on the dry weight of the second plurality of lignocellulose substrates.

3. A composite product, comprising: one or more core layers disposed between two face layers, wherein: the core layers comprise: a first plurality of lignocellulose substrates; and an at least partially cured aldehyde-based resin, wherein the core layers comprise about 0.5 wt % to about 8 wt % of the at least partially cured aldehyde-based resin, based on the dry weight of the first plurality of lignocellulose substrates; and the face layers comprise: a second plurality of lignocellulose substrates; and an at least partially cured, powdered binder, wherein the at least partially cured, powdered binder comprises: about 60 wt % to about 95 wt % of a powdered carbohydrate; and about 5 wt % to about 40 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, the powdered nitrogen-containing compound comprises an ammonium compound, an alkylammonium compound, an amino acid, or any mixture thereof, and the face layers comprises about 0.5 wt % to about 8 wt % of the powdered binder, based on the dry weight of the second plurality of lignocellulose substrates.

4. The composite product according to paragraph 3, wherein the core layers further comprise about 0.1 wt % to about 5 wt % of a first wax, based on the dry weight of the first plurality of lignocellulose substrates, and wherein the face layers further comprise about 0.1 wt % to about 5 wt % of a second wax, based on the dry weight of the second plurality of lignocellulose substrates.

5. The composite product according to any one of paragraphs 1 to 4, wherein, prior to curing, the powdered binder comprises: about 60 wt % to about 95 wt % of the powdered carbohydrate; and about 5 wt % to about 40 wt % of the powdered nitrogen-containing compound, wherein the weight percent values are based on the total weight of the powdered carbohydrate and the powdered nitrogen-containing compound.

6. The composite product according to any one of paragraphs 1 to 5, wherein, prior to curing, the powdered binder comprises: about 70 wt % to about 90 wt % of the powdered carbohydrate; and about 10 wt % to about 30 wt % of the powdered nitrogen-containing compound, wherein the weight percent values are based on the total weight of the powdered carbohydrate and the powdered nitrogen-containing compound.

7. The composite product according to any one of paragraphs 1 to 6, wherein the composite product further comprises about 0.1 wt % to about 5 wt % of a wax, based on the dry weight of the lignocellulose substrates.

8. The composite product according to paragraph 7, wherein the wax comprises slack wax.

9. The composite product according to any one of paragraphs 1 to 8, wherein the powdered carbohydrate comprises glucose, fructose, galactose, sucrose, lactose, maltose, lactulose, isomers thereof, hydrates thereof, salts thereof, or any mixture thereof.

10. The composite product according to paragraph 9, wherein the powdered nitrogen-containing compound comprises ammonium lignosulfonate, ammonium sulfamate, alkylammonium lignosulfonate, alkylammonium sulfamate, lysine, arginine, histidine, isomers thereof, hydrates thereof, salts thereof, or any mixture thereof.

11. The composite product according to any one of paragraphs 1 to 10, wherein the powdered carbohydrate comprises glucose, fructose, galactose, sucrose, lactose, maltose, lactulose, isomers thereof, hydrates thereof, salts thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, isomers thereof, hydrates thereof, salts thereof, or any mixture thereof.

12. The composite product according to any one of paragraphs 1 to 11, wherein the monosaccharide comprises fructose (levulose), galactose, glucose (dextrose), mannose, ribose, sorbose, xylose, glyceraldehyde (aldotrioses, such as L-glyceraldehyde and D-glyceraldehyde), dihydroxyacetone, erythrose, isomers thereof, hydrates thereof, salts thereof, or any mixture thereof.

13. The composite product according to any one of paragraphs 1 to 12, wherein the disaccharide comprises sucrose, lactose, maltose, lactulose, trehalose, cellobiose, isomers thereof, hydrates thereof, salts thereof, or any mixture thereof.

14. The composite product according to any one of paragraphs 1 to 13, wherein the powdered nitrogen-containing compound comprises ammonium lignosulfonate, ammonium sulfamate, ammonium sulfite, ammonium sulfate, ammonium nitrite, ammonium nitrate, ammonium phosphite, ammonium phosphate, ammonium carbonate, ammonium hydroxide, alkylammonium lignosulfonate, alkylammonium sulfamate, alkylammonium sulfite, alkylammonium sulfate, alkylammonium nitrite, alkylammonium nitrate, alkylammonium phosphite, alkylammonium phosphate, alkylammonium carbonate, alkylammonium hydroxide, isomers thereof, hydrates thereof, salts thereof, or any mixture thereof.

15. The composite product according to any one of paragraphs 1 to 14, wherein the powdered nitrogen-containing compound comprises lysine, arginine, histidine, asparagine, glutamine, tryptophan, isomers thereof, hydrates thereof, salts thereof, or any mixture thereof.

16. The composite product according to any one of paragraphs 1 to 15, wherein the powdered carbohydrate comprises glucose and the powdered nitrogen-containing compound comprises ammonium lignosulfonate or lysine.

17. The composite product according to paragraph 16, wherein the powdered binder comprises: about 70 wt % to about 90 wt % of the glucose; and about 10 wt % to about 30 wt % of the ammonium lignosulfonate, wherein the weight percent values are based on the total weight of the powdered carbohydrate and the powdered nitrogen-containing compound.

18. The composite product according to paragraph 16, wherein the powdered binder comprises: about 70 wt % to about 90 wt % of the glucose; and about 10 wt % to about 30 wt % of the lysine, wherein the weight percent values are based on the total weight of the powdered carbohydrate and the powdered nitrogen-containing compound.

19. The composite product according to any one of paragraphs 1 to 18, wherein the composite product has an internal bond strength of about 207 kPa to about 552 kPa.

20. The composite product according to any one of paragraphs 1 to 19, wherein the composite product comprises about 1 wt % to about 5 wt % of the powdered binder, based on the dry weight of the lignocellulose substrates, as measured according to ASTM D1037-12.

21. A method for producing a composite product, comprising: contacting a plurality of lignocellulose substrates with a powdered binder to produce a mixture, wherein the powdered binder comprises: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, or any mixture thereof and heating the mixture to a temperature of about 100° C. to about 300° C. for about 1 minute to less than 10 minutes to produce a composite product comprising the powdered binder at least partially cured.

22. A method for producing a composite product, comprising: contacting a plurality of lignocellulose substrates with a powdered binder to produce a mixture, wherein the powdered binder comprises: about 5 wt % to about 95 wt % of a powdered carbohydrate; and about 5 wt % to about 95 wt % of a powdered nitrogen-containing compound; wherein the weight percent values are based on the total weight of the powdered carbohydrate and the powdered nitrogen-containing compound, wherein the powdered carbohydrate comprises a monosaccharide, a disaccharide, or a mixture thereof, and wherein the powdered nitrogen-containing compound comprises an ammonium compound, an alkylammonium compound, an amino acid, or any mixture thereof; and at least partially curing the binder composition to produce a composite product from the mixture.

23. A method for producing a composite product, comprising: contacting a plurality of lignocellulose substrates with a powdered binder to produce a mixture, wherein the powdered binder comprises: about 60 wt % to about 95 wt % of a powdered carbohydrate; and about 5 wt % to about 40 wt % of a powdered nitrogen-containing compound; wherein the weight percent values are based on the total weight of the powdered carbohydrate and the powdered nitrogen-containing compound, wherein the powdered carbohydrate comprises a monosaccharide, a disaccharide, or a mixture thereof, and wherein the powdered nitrogen-containing compound comprises an ammonium compound, an alkylammonium compound, an amino acid, or any mixture thereof; and at least partially curing the binder composition to produce a composite product from the mixture.

24. The method according to any one of paragraphs 21 to 23, wherein the mixture is heated at a temperature of about 140° C. to about 280° C. for about 2 minutes to less than 8 minutes to produce the composite product.

25. The method according to any one of paragraphs 21 to 24, wherein the mixture is heated at a temperature of about 140° C. to about 280° C. for about 3 minutes to about 6 minutes to produce the composite product.

26. The method according to any one of paragraphs 21 to 25, wherein the composite product is an oriented strand board comprising one or more core layers disposed between two face layers, wherein the core layers comprise a core composition and the face layers comprise a face composition, and wherein the face composition comprises the at least partially cured binder composition.

27. The method according to paragraph 26, wherein the composite product has a face to core ratio of about 40:60 to about 60:40.

28. The method according to paragraph 26, wherein the composite product has a face to core ratio of about 50:50 to about 60:40.

29. The method according to paragraph 26, wherein the composite product has a face to core ratio of about 50:50 to about 65:35.

30. The method according to paragraph 26, wherein the composite product has a face to core ratio of about 52:58 to about 60:40.

31. The method according to paragraph 26, wherein the composite product has a face to core ratio of about 55:45.

32. The method according to paragraph 26, wherein the core composition comprises an at least partially cured aldehyde-based resin, and wherein the at least partially cured aldehyde-based resin comprises a phenol-formaldehyde resin, a urea-formaldehyde resin, a melamine-formaldehyde resin, a resorcinol-formaldehyde resin, a phenol-resorcinol-formaldehyde resin, a phenol-urea-formaldehyde resin, a melamine-urea-formaldehyde resin, a phenol-melamine-formaldehyde resin, or any mixture thereof.

33. The method according to any one of paragraphs 21 to 32, wherein the mixture is pressed and heated for about 3 minutes to about 6 minutes to produce the composite product, and wherein the composite product has an internal bond strength of about 207 kPa to about 552 kPa, as measured according to ASTM D1037-12.

34. The method according to any one of paragraphs 21 to 33, wherein the composite product has a thickness swell value of about 5% to about 30%.

35. The method according to any one of paragraphs 21 to 34, wherein the powdered binder comprises: about 60 wt % to about 95 wt % of the powdered carbohydrate; and about 5 wt % to about 40 wt % of the powdered nitrogen-containing compound, wherein the weight percent values are based on the total weight of the powdered carbohydrate and the powdered nitrogen-containing compound.

36. The method according to any one of paragraphs 21 to 35, wherein the powdered binder comprises: about 70 wt % to about 90 wt % of the powdered carbohydrate; and about 10 wt % to about 30 wt % of the powdered nitrogen-containing compound, wherein the weight percent values are based on the total weight of the powdered carbohydrate and the powdered nitrogen-containing compound.

37. The method according to any one of paragraphs 21 to 36, wherein the mixture comprises about 0.5 wt % to about 10 wt % of the powdered binder, based on the dry weight of the lignocellulose substrates.

38. The method according to any one of paragraphs 21 to 37, wherein the mixture comprises about 1 wt % to about 5 wt % of the powdered binder, based on the dry weight of the lignocellulose substrates.

39. The method according to any one of paragraphs 21 to 38, wherein the mixture comprises about 1 wt % to about 3 wt % of the powdered binder, based on the dry weight of the lignocellulose substrates.

40. The method according to any one of paragraphs 21 to 39, wherein the mixture comprises about 1.5 wt % to about 2.5 wt % of the powdered binder, based on the dry weight of the lignocellulose substrates.

41. The method according to any one of paragraphs 21 to 40, wherein the mixture comprises about 2 wt % to about 3 wt % of the powdered binder, based on the dry weight of the lignocellulose substrates.

42. The method according to any one of paragraphs 21 to 41, wherein the mixture further comprises a wax.

43. The method according to paragraph 42, wherein the mixture comprises about 0.1 wt % to about 10 wt % of the wax, based on the dry weight of the lignocellulose substrates.

44. The method according to paragraph 42, wherein the mixture comprises about 0.1 wt % to about 5 wt % of the wax, based on the dry weight of the lignocellulose substrates.

45. The method according to paragraph 42, wherein the mixture comprises about 0.1 wt % to about 3 wt % of the wax, based on the dry weight of the lignocellulose substrates.

46. The method according to paragraph 42, wherein the mixture comprises about 0.1 wt % to about 2 wt % of the wax, based on the dry weight of the lignocellulose substrates.

47. The method according to paragraph 42, wherein the mixture comprises about 0.5 wt % to about 3 wt % of the wax, based on the dry weight of the lignocellulose substrates.

48. The method according to any one of paragraphs 42 to 47, wherein the wax comprises slack wax.

49. The method according to any one of paragraphs 21 to 48, wherein the powdered carbohydrate comprises glucose, fructose, galactose, sucrose, lactose, maltose, lactulose, isomers thereof, hydrates thereof, salts thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, isomers thereof, hydrates thereof, salts thereof, or any mixture thereof.

50. The method according to any one of paragraphs 21 to 49, wherein the monosaccharide comprises fructose (levulose), galactose, glucose (dextrose), mannose, ribose, sorbose, xylose, glyceraldehyde (aldotrioses, such as L-glyceraldehyde and D-glyceraldehyde), dihydroxyacetone, erythrose, isomers thereof, hydrates thereof, salts thereof, or any mixture thereof.

51. The method according to any one of paragraphs 21 to 50, wherein the disaccharide comprises sucrose, lactose, maltose, lactulose, trehalose, cellobiose, isomers thereof, hydrates thereof, salts thereof, or any mixture thereof.

52. The method according to any one of paragraphs 21 to 51, wherein the powdered nitrogen-containing compound comprises ammonium lignosulfonate, ammonium sulfamate, ammonium sulfite, ammonium sulfate, ammonium nitrite, ammonium nitrate, ammonium phosphite, ammonium phosphate, ammonium carbonate, ammonium hydroxide, alkylammonium lignosulfonate, alkylammonium sulfamate, alkylammonium sulfite, alkylammonium sulfate, alkylammonium nitrite, alkylammonium nitrate, alkylammonium phosphite, alkylammonium phosphate, alkylammonium carbonate, alkylammonium hydroxide, isomers thereof, hydrates thereof, salts thereof, or any mixture thereof.

53. The method according to any one of paragraphs 21 to 52, wherein the powdered nitrogen-containing compound comprises lysine, arginine, histidine, asparagine, glutamine, tryptophan, isomers thereof, hydrates thereof, salts thereof, or any mixture thereof.

54. The method according to any one of paragraphs 21 to 53, wherein the powdered carbohydrate comprises glucose and the powdered nitrogen-containing compound comprises ammonium lignosulfonate or lysine.

55. The method according to paragraph 54, wherein the powdered binder comprises: about 70 wt % to about 90 wt % of the glucose; and about 10 wt % to about 30 wt % of the ammonium lignosulfonate, wherein the weight percent values are based on the total weight of the powdered carbohydrate and the powdered nitrogen-containing compound.

56. The method according to paragraph 54, wherein the powdered binder comprises: about 70 wt % to about 90 wt % of the glucose; and about 10 wt % to about 30 wt % of the lysine, wherein the weight percent values are based on the total weight of the powdered carbohydrate and the powdered nitrogen-containing compound.

57. The method according to any one of paragraphs 21 to 56, wherein the composite product is an oriented strand board, a medium density fiberboard, a wafer board, or a particle board.

58. The method according to any one of paragraphs 21 to 57, wherein the powdered binder is in powder form when contacted with the plurality of lignocellulose substrates.

59. A powdered binder, comprising: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises glucose, and the powdered nitrogen-containing compound comprises ammonium lignosulfonate, lysine, or a mixture thereof.

60. A powdered binder, comprising: about 70 wt % to about 90 wt % of a powdered carbohydrate; and about 10 wt % to about 30 wt % of a powdered nitrogen-containing compound, wherein: the weight percent values are based on the total weight of the powdered carbohydrate and the powdered nitrogen-containing compound, the powdered carbohydrate comprises glucose, and the powdered nitrogen-containing compound comprises ammonium lignosulfonate, lysine, or a mixture thereof.

61. A powdered binder, comprising: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, or any mixture thereof.

62. A powdered binder, comprising: about 60 wt % to about 95 wt % of a powdered carbohydrate; and about 5 wt % to about 40 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, or any mixture thereof.

63. The powdered binder according to any one of paragraphs 59 to 62, wherein the powdered binder further comprises a wax.

64. The powdered binder according to paragraph 63, wherein the powdered binder comprises about 0.1 wt % to about 10 wt % of the wax, based on the dry weight of the lignocellulose substrates.

65. The powdered binder according to paragraph 63, wherein the powdered binder comprises 0.1 wt % to about 5 wt % of the wax, based on the dry weight of the lignocellulose substrates.

66. The powdered binder according to paragraph 63, wherein the powdered binder comprises 0.1 wt % to about 3 wt % of the wax, based on the dry weight of the lignocellulose substrates.

67. The powdered binder according to paragraph 63, wherein the powdered binder comprises 0.1 wt % to about 2 wt % of the wax, based on the dry weight of the lignocellulose substrates.

68. The powdered binder according to paragraph 63, wherein the powdered binder comprises 0.5 wt % to about 3 wt % of the wax, based on the dry weight of the lignocellulose substrates.

69. The powdered binder according to any one of paragraphs 63 to 68, wherein the wax comprises slack wax.

70. The powdered binder according to any one of paragraphs 59 to 69, wherein the powdered carbohydrate comprises glucose, fructose, galactose, sucrose, lactose, maltose, lactulose, isomers thereof, hydrates thereof, salts thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, isomers thereof, hydrates thereof, salts thereof, or any mixture thereof.

71. The powdered binder according to any one of paragraphs 59 to 70, wherein the monosaccharide comprises fructose (levulose), galactose, glucose (dextrose), mannose, ribose, sorbose, xylose, glyceraldehyde (aldotrioses, such as L-glyceraldehyde and D-glyceraldehyde), dihydroxyacetone, erythrose, isomers thereof, hydrates thereof, salts thereof, or any mixture thereof.

72. The powdered binder according to any one of paragraphs 59 to 71, wherein the disaccharide comprises sucrose, lactose, maltose, lactulose, trehalose, cellobiose, isomers thereof, hydrates thereof, salts thereof, or any mixture thereof.

73. The powdered binder according to any one of paragraphs 59 to 72, wherein the powdered nitrogen-containing compound comprises ammonium lignosulfonate, ammonium sulfamate, ammonium sulfite, ammonium sulfate, ammonium nitrite, ammonium nitrate, ammonium phosphite, ammonium phosphate, ammonium carbonate, ammonium hydroxide, alkylammonium lignosulfonate, alkylammonium sulfamate, alkylammonium sulfite, alkylammonium sulfate, alkylammonium nitrite, alkylammonium nitrate, alkylammonium phosphite, alkylammonium phosphate, alkylammonium carbonate, alkylammonium hydroxide, isomers thereof, hydrates thereof, salts thereof, or any mixture thereof.

74. The powdered binder according to any one of paragraphs 59 to 73, wherein the powdered nitrogen-containing compound comprises lysine, arginine, histidine, asparagine, glutamine, tryptophan, isomers thereof, hydrates thereof, salts thereof, or any mixture thereof.

75. The powdered binder according to any one of paragraphs 59 to 74, wherein the powdered carbohydrate comprises glucose and the powdered nitrogen-containing compound comprises ammonium lignosulfonate or lysine.

76. The powdered binder according to paragraph 75, wherein the powdered binder comprises: about 70 wt % to about 90 wt % of the glucose; and about 10 wt % to about 30 wt % of the ammonium lignosulfonate, wherein the weight percent values are based on the total weight of the powdered carbohydrate and the powdered nitrogen-containing compound.

77. The powdered binder according to paragraph 75, wherein the powdered binder comprises: about 70 wt % to about 90 wt % of the glucose; and about 10 wt % to about 30 wt % of the lysine, wherein the weight percent values are based on the total weight of the powdered carbohydrate and the powdered nitrogen-containing compound.

78. A composite product, comprising: a plurality of lignocellulose substrates; and an at least partially cured, powdered binder, wherein, prior to curing, the powdered binder comprises: about 5 wt % to about 95 wt % of a powdered carbohydrate, and about 5 wt % to about 95 wt % of a powdered nitrogen-containing compound, wherein: the weight percent values are based on a total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, a hydrate thereof, a salt thereof, or any mixture thereof.

79. The composite product according to paragraph 78, wherein, prior to curing, the powdered binder comprises about 60 wt % to about 95 wt % of the powdered carbohydrate and about 5 wt % to about 40 wt % of the powdered nitrogen-containing compound, wherein the weight percent values are based on the total weight of the powdered carbohydrate and the powdered nitrogen-containing compound.

80. The composite product according to paragraph 78 or 79, wherein, prior to curing, the powdered binder comprises about 70 wt % to about 90 wt % of the powdered carbohydrate and about 10 wt % to about 30 wt % of the powdered nitrogen-containing compound, wherein the weight percent values are based on the total weight of the powdered carbohydrate and the powdered nitrogen-containing compound.

81. The composite product according to any one of paragraphs 78 to 80, wherein carbohydrate comprises glucose and the powdered nitrogen-containing compound comprises ammonium lignosulfonate, lysine, or a mixture thereof.

82. The composite product according to any one of paragraphs 78 to 81, wherein the composite product further comprises about 0.1 wt % to about 5 wt % of a wax, based on a dry weight of the lignocellulose substrates.

83. The composite product according to any one of paragraphs 78 to 80 or 82, wherein the powdered carbohydrate comprises glucose, fructose, galactose, sucrose, lactose, maltose, lactulose, an isomer thereof, a hydrate thereof, a salt thereof, or any mixture thereof.

84. The composite product according to any one of paragraphs 78 to 80, 82, or 83, wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

85. The composite according to any one of paragraphs 78 to 84, wherein the composite product has an internal bond strength of about 207 kPa to about 552 kPa, as measured according to ASTM D1037-12, and wherein the composite product comprises about 1 wt % to about 5 wt % of the at least partially cured, powdered binder, based on a dry weight of the lignocellulose substrates.

86. The composite product according to any one of paragraphs 78, 82, or 85, wherein, prior to curing, the powdered binder comprises about 70 wt % to about 90 wt % of the powdered carbohydrate and about 10 wt % to about 30 wt % of the powdered nitrogen-containing compound, wherein the weight percent values are based on the total weight of the powdered carbohydrate and the powdered nitrogen-containing compound, wherein the powdered carbohydrate comprises glucose, fructose, galactose, sucrose, lactose, maltose, lactulose, an isomer thereof, a hydrate thereof, a salt thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

87. The composite product according to any one of paragraphs 78 to 86, wherein the composite product is an oriented strand board comprising a core layer disposed between two face layers, wherein the core layer comprise a core composition and the two face layers each comprise a face composition, wherein the face composition comprises the at least partially cured binder composition.

88. The composite product according to paragraph 87, wherein the composite product has a face to core ratio of about 40:60 to about 60:40.

89. The composite product according to paragraph 87 or 88, wherein the core composition comprises an at least partially cured aldehyde-based resin, and wherein the at least partially cured aldehyde-based resin comprises a phenol-formaldehyde resin, a urea-formaldehyde resin, a melamine-formaldehyde resin, a resorcinol-formaldehyde resin, a phenol-resorcinol-formaldehyde resin, a phenol-urea-formaldehyde resin, a melamine-urea-formaldehyde resin, a phenol-melamine-formaldehyde resin, or any mixture thereof.

90. A method for producing a composite product, comprising: contacting a plurality of lignocellulose substrates with a powdered binder to produce a mixture, wherein the powdered binder comprises: about 5 wt % to about 95 wt % of a powdered carbohydrate; and about 5 wt % to about 95 wt % of a powdered nitrogen-containing compound, wherein: the weight percent values are based on the total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, a hydrate thereof, a salt thereof, or any mixture thereof; and heating the mixture at a temperature of about 100° C. to about 300° C. for about 1 minute to less than 10 minutes to produce a composite product comprising the powdered binder at least partially cured.

91. The method according to paragraph 90, wherein the mixture is heated at a temperature of about 140° C. to about 280° C. for about 2 minutes to less than 8 minutes to produce the composite product, and wherein the composite product has an internal bond strength of about 207 kPa to about 552 kPa, as measured according to ASTM D1037-12.

92. The method according to paragraph 90 or 91, wherein the composite product is an oriented strand board comprising one or more core layers disposed between two face layers, wherein the core layers comprise a core composition and the face layers comprise a face composition, and wherein the face composition comprises the at least partially cured binder composition.

93. The method according to paragraph 92, wherein the core composition comprises an at least partially cured aldehyde-based resin.

94. The method according to paragraph 93, wherein the at least partially cured aldehyde-based resin comprises a phenol-formaldehyde resin, a urea-formaldehyde resin, a melamine-formaldehyde resin, a resorcinol-formaldehyde resin, a phenol-resorcinol-formaldehyde resin, a phenol-urea-formaldehyde resin, a melamine-urea-formaldehyde resin, a phenol-melamine-formaldehyde resin, or any mixture thereof.

95. The method according to any one of paragraphs 90 to 94, wherein the powdered binder comprises about 60 wt % to about 95 wt % of the powdered carbohydrate and about 5 wt % to about 40 wt % of the powdered nitrogen-containing compound, and wherein the weight percent values are based on the total weight of the powdered carbohydrate and the powdered nitrogen-containing compound.

96. The method according to any one of paragraphs 90 to 95, wherein the powdered carbohydrate comprises glucose, fructose, galactose, sucrose, lactose, maltose, lactulose, an isomer thereof, a hydrate thereof, a salt thereof, or any mixture thereof.

97. The method according to any one of paragraphs 90 to 96, wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

98. The composite product or method according to any one of paragraphs 78 to 97, wherein the at least partially cured powdered binder is at least partially cured without the use of steam.

99. The composite product or method according to any one of paragraphs 78 to 99, wherein the at least partially cured powdered binder is at least partially cured in the absence of any steam.

100. The composite product or method according to any one of paragraphs 78 to 99, wherein the at least partially cured powdered binder comprises melanoidins, and wherein the melanoidins are not crosslinked with a crosslink derived from a polycarboxylic acid.

101. The composite product or method according to any one of paragraphs 78 to 100, wherein the at least partially cured powdered binder comprises melanoidins, and wherein the melanoidins are not crosslinked with a crosslink derived from a carboxylic anhydride.

102. The composite product or method according to any one of paragraphs 78 to 101, wherein the at least partially cured powdered binder comprises melanoidins, and wherein the melanoidins are not crosslinked with a crosslink derived from a polycarboxylic acid, a polymeric polycarboxylic acid, or a carboxylic anhydride.

103. The composite product or method according to any one of paragraphs 78 to 102, wherein the at least partially cured powdered binder comprises melanoidins, and wherein the melanoidins are substantially free of any crosslink derived from a polycarboxylic acid, a polymeric polycarboxylic acid, and a carboxylic anhydride.

104. The composite product or method according to any one of paragraphs 78 to 103, wherein the at least partially cured powdered binder comprises melanoidins, and wherein the melanoidins are not crosslinked with one another.

105. The composite product or method according to any one of paragraphs 78 to 104, wherein the composite product has a density of about 0.48 g/cm$^3$, about 0.55 g/cm$^3$, about 0.6 g/cm$^3$, about 0.65 g/cm$^3$, or about 0.7 g/cm$^3$ to about 0.8 g/cm$^3$, about 0.85 g/cm$^3$, about 0.9 g/cm$^3$, or about 0.96 g/cm$^3$.

106. The composite product or method according to any one of paragraphs 78 to 105, wherein the composite product has a water absorption of about 10 wt %, about 15 wt %, about 20 wt %, or about 25 wt % to about 35 wt %, about 40 wt %, about 45 wt %, about 55 wt %, or about 60 wt %, as measured according to ASTM D1037-12.

107. The composite product or method according to any one of paragraphs 78 to 106, wherein the composite product has a water absorption of about 60 wt % or less, about 55 wt % or less, about 50 wt % or less, about 45 wt % or less, about 44 wt % or less, about 43 wt % or less, about 42 wt % or less, about 41 wt % or less, about 40 wt % or less, about 39 wt % or less, about 38 wt % or less, about 37 wt % or less, about 36 wt % or less, about 35 wt % or less, about 34 wt % or less, about 33 wt % or less, about 32 wt % or less, about 31 wt % or less, about 30 wt % or less, about 29 wt % or less, about 28 wt % or less, about 27 wt % or less, about 26 wt % or less, about 25 wt % or less, about 24 wt % or less, about 23 wt % or less, about 22 wt % or less, about 21 wt % or less, about 20 wt % or less, about 15 wt % or less, or about 10 wt % or less, as measured according to ASTM D1037-12.

108. The composite product or method according to any one of paragraphs 78 to 107, wherein the composite product has a thickness swelling of about 5 wt %, about 8 wt %, about 10 wt %, or about 15 wt % to about 20 wt %, about 25 wt %, about 30 wt %, about 35 wt %, or about 40 wt %, as measured according to ASTM D1037-12.

109. The composite product or method according to any one of paragraphs 78 to 108, wherein the composite product is produced by heating a resinated furnish comprising the plurality of lignocellulose substrates and the powdered binder at a temperature of about 140° C. to about 280° C. for a time of less than 10 minutes.

110. The composite product or method according to any one of paragraphs 78 to 109, wherein the composite product is produced by heating a resinated furnish comprising the plurality of lignocellulose substrates and the powdered binder at a temperature of about 140° C. to about 280° C. for a time of about 1 minute to less than 8 minutes.

111. The composite product or method according to any one of paragraphs 78 to 110, wherein the composite product is produced by heating a resinated furnish comprising the plurality of lignocellulose substrates and the powdered binder at a temperature of about 140° C. to about 280° C. for a time of about 1 minute to less than 6 minutes.

112. A resinated furnish, comprising: a plurality of lignocellulose substrates; and a powdered binder, wherein the powdered binder comprises: about 5 wt % to about 95 wt % of a powdered carbohydrate, and about 5 wt % to about 95 wt % of a powdered nitrogen-containing compound, wherein: the weight percent values are based on a total weight of the powdered carbohydrate and the powdered nitrogen-containing compound, the powdered carbohydrate comprises a monosaccharide, a disaccharide, or a mixture thereof, and the powdered nitrogen-containing compound comprises an ammonium compound, an alkylammonium compound, an amino acid, a hydrate thereof, a salt thereof, or any mixture thereof.

113. The resinated furnish according to paragraph 112, wherein the powdered binder comprises about 60 wt % to about 90 wt % of the powdered carbohydrate and about 10 wt % to about 40 wt % of the powdered nitrogen-containing compound, wherein the weight percent values are based on the total weight of the powdered carbohydrate and the powdered nitrogen-containing compound.

114. The resinated furnish according to paragraph 112 or 113, wherein the powdered binder comprises about 70 wt % to about 90 wt % of the powdered carbohydrate and about 10 wt % to about 30 wt % of the powdered nitrogen-containing compound, wherein the weight percent values are based on the total weight of the powdered carbohydrate and the powdered nitrogen-containing compound.

115. The resinated furnish according to any one of paragraphs 112 to 114, wherein the powdered carbohydrate comprises glucose, fructose, galactose, sucrose, lactose, maltose, lactulose, an isomer thereof, a hydrate thereof, a salt thereof, or any mixture thereof.

116. The resinated furnish according to any one of paragraphs 112 to 115, wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

117. The resinated furnish according to any one of paragraphs 112 to 116, wherein the resinated furnish comprises less than 5 wt %, less than 4 wt %, less than 3 wt %, less than 2 wt %, less than 1 wt %, less than 0.5 wt %, or less than 0.1 wt % of any polycarboxylic acid.

118. The resinated furnish according to any one of paragraphs 112 to 116, wherein the resinated furnish comprises less than 5 wt %, less than 4 wt %, less than 3 wt %, less than 2 wt %, less than 1 wt %, less than 0.5 wt %, or less than 0.1 wt % of any carboxylic anhydride.

119. The resinated furnish according to any one of paragraphs 112 to 116, wherein the resinated furnish comprises less than 5 wt %, less than 4 wt %, less than 3 wt %, less than 2 wt %, less than 1 wt %, less than 0.5 wt %, or less than 0.1 wt % of any polycarboxylic acid, any polymeric polycarboxylic acid, and any carboxylic anhydride.

120. The resinated furnish according to any one of paragraphs 112 to 116, wherein the resinated furnish is free of any polycarboxylic acid.

121. The resinated furnish according to any one of paragraphs 112 to 116, wherein the resinated furnish is free of any carboxylic anhydride.

122. The resinated furnish according to any one of paragraphs 112 to 116, wherein the resinated furnish is free of any polycarboxylic acid, polymeric polycarboxylic acid, and any carboxylic anhydride.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. A composite product, comprising:
a plurality of lignocellulose substrates; and
an at least partially cured, powdered binder, wherein, prior to curing, the powdered binder comprises:
 about 5 wt % to about 95 wt % of a powdered carbohydrate, and
 about 5 wt % to about 95 wt % of a powdered nitrogen-containing compound,
 wherein:
  the weight percent values are based on a total weight of the powdered carbohydrate and the powdered nitrogen-containing compound,
  the powdered carbohydrate comprises a monosaccharide, a disaccharide, or a mixture thereof, and
  the powdered nitrogen-containing compound comprises an ammonium compound, an alkylammonium compound, an amino acid, a hydrate thereof, a salt thereof, or any mixture thereof, and
 wherein the composite product comprises about 1 wt % to about 5 wt % of the at least partially cured, powdered binder, based on a dry weight of the plurality of lignocellulose substrates.

2. The composite product of claim 1, wherein, prior to curing, the powdered binder comprises about 60 wt % to about 95 wt % of the powdered carbohydrate and about 5 wt % to about 40 wt % of the powdered nitrogen-containing compound, wherein the weight percent values are based on the total weight of the powdered carbohydrate and the powdered nitrogen-containing compound.

3. The composite product of claim 1, wherein, prior to curing, the powdered binder comprises about 70 wt % to about 90 wt % of the powdered carbohydrate and about 10 wt % to about 30 wt % of the powdered nitrogen-containing compound, wherein the weight percent values are based on the total weight of the powdered carbohydrate and the powdered nitrogen-containing compound.

4. The composite product of claim 3, wherein carbohydrate comprises glucose and the powdered nitrogen-containing compound comprises ammonium lignosulfonate, lysine, or a mixture thereof.

5. The composite product of claim 1, wherein the composite product further comprises about 0.1 wt % to about 5 wt % of a wax, based on a dry weight of the lignocellulose substrates.

6. The composite product of claim 1, wherein the powdered carbohydrate comprises glucose, fructose, galactose, sucrose, lactose, maltose, lactulose, an isomer thereof, a hydrate thereof, a salt thereof, or any mixture thereof.

7. The composite product of claim 1, wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

8. The composite product of claim 1, wherein the composite product has an internal bond strength of about 207 kPa to about 552 kPa, as measured according to ASTM D1037-12.

9. The composite product of claim 1, wherein, prior to curing, the powdered binder comprises about 70 wt % to about 90 wt % of the powdered carbohydrate and about 10 wt % to about 30 wt % of the powdered nitrogen-containing compound, wherein the weight percent values are based on the total weight of the powdered carbohydrate and the powdered nitrogen-containing compound, wherein the powdered carbohydrate comprises glucose, fructose, galactose, sucrose, lactose, maltose, lactulose, an isomer thereof, a hydrate thereof, a salt thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

10. The composite product of claim 9, wherein the composite product has an internal bond strength of about 207 kPa to about 552 kPa, as measured according to ASTM D1037-12.

11. The composite product of claim 1, wherein the composite product is an oriented strand board comprising a core layer disposed between two face layers, wherein the core layer comprise a core composition and the two face layers each comprise a face composition, wherein the face composition comprises the at least partially cured binder composition, and wherein the composite product has a face to core ratio of about 40:60 to about 60:40.

12. The composite product of claim 11, wherein the core composition comprises an at least partially cured aldehyde-based resin, and wherein the at least partially cured aldehyde-based resin comprises a phenol-formaldehyde resin, a urea-formaldehyde resin, a melamine-formaldehyde resin, a resorcinol-formaldehyde resin, a phenol-resorcinol-formaldehyde resin, a phenol-urea-formaldehyde resin, a melamine-urea-formaldehyde resin, a phenol-melamine-formaldehyde resin, or any mixture thereof.

13. A method for producing a composite product, comprising:
contacting a plurality of lignocellulose substrates with a powdered binder to produce a mixture, wherein the powdered binder comprises:
about 5 wt % to about 95 wt % of a powdered carbohydrate; and
about 5 wt % to about 95 wt % of a powdered nitrogen-containing compound,
wherein:
the weight percent values are based on a total weight of the powdered carbohydrate and the powdered nitrogen-containing compound,
the powdered carbohydrate comprises a monosaccharide, a disaccharide, or a mixture thereof, and
the powdered nitrogen-containing compound comprises an ammonium compound, an alkylammonium compound, an amino acid, a hydrate thereof, a salt thereof, or any mixture thereof; and
heating the mixture at a temperature of about 100° C. to about 300° C. for about 1 minute to less than 10 minutes to produce a composite product comprising the powdered binder at least partially cured.

14. The method of claim 13, wherein the mixture is heated at a temperature of about 140° C. to about 280° C. for about 2 minutes to less than 8 minutes to produce the composite product, and wherein the composite product has an internal bond strength of about 207 kPa to about 552 kPa, as measured according to ASTM D1037-12.

15. The method of claim 13, wherein the composite product is an oriented strand board comprising one or more core layers disposed between two face layers, wherein the core layers comprise a core composition and the face layers comprise a face composition, and wherein the face composition comprises the at least partially cured binder composition.

16. The method of claim 15, wherein the core composition comprises an at least partially cured aldehyde-based resin, and wherein the at least partially cured aldehyde-based resin comprises a phenol-formaldehyde resin, a urea-formaldehyde resin, a melamine-formaldehyde resin, a resorcinol-formaldehyde resin, a phenol-resorcinol-formaldehyde resin, a phenol-urea-formaldehyde resin, a melamine-urea-formaldehyde resin, a phenol-melamine-formaldehyde resin, or any mixture thereof.

17. The method of claim 13, wherein the powdered binder comprises about 60 wt % to about 95 wt % of the powdered carbohydrate and about 5 wt % to about 40 wt % of the powdered nitrogen-containing compound, and wherein the weight percent values are based on the total weight of the powdered carbohydrate and the powdered nitrogen-containing compound.

18. The method of claim 13, wherein the powdered carbohydrate comprises glucose, fructose, galactose, sucrose, lactose, maltose, lactulose, an isomer thereof, a hydrate thereof, a salt thereof, or any mixture thereof, and wherein the powdered nitrogen-containing compound comprises ammonium lignosulfonate, ammonium sulfamate, alkylammonium lignosulfonate, alkylammonium sulfamate, lysine, arginine, histidine, an isomer thereof, a hydrate thereof, a salt thereof, or any mixture thereof.

* * * * *